United States Patent Office 2,913,925
Patented Nov. 24, 1959

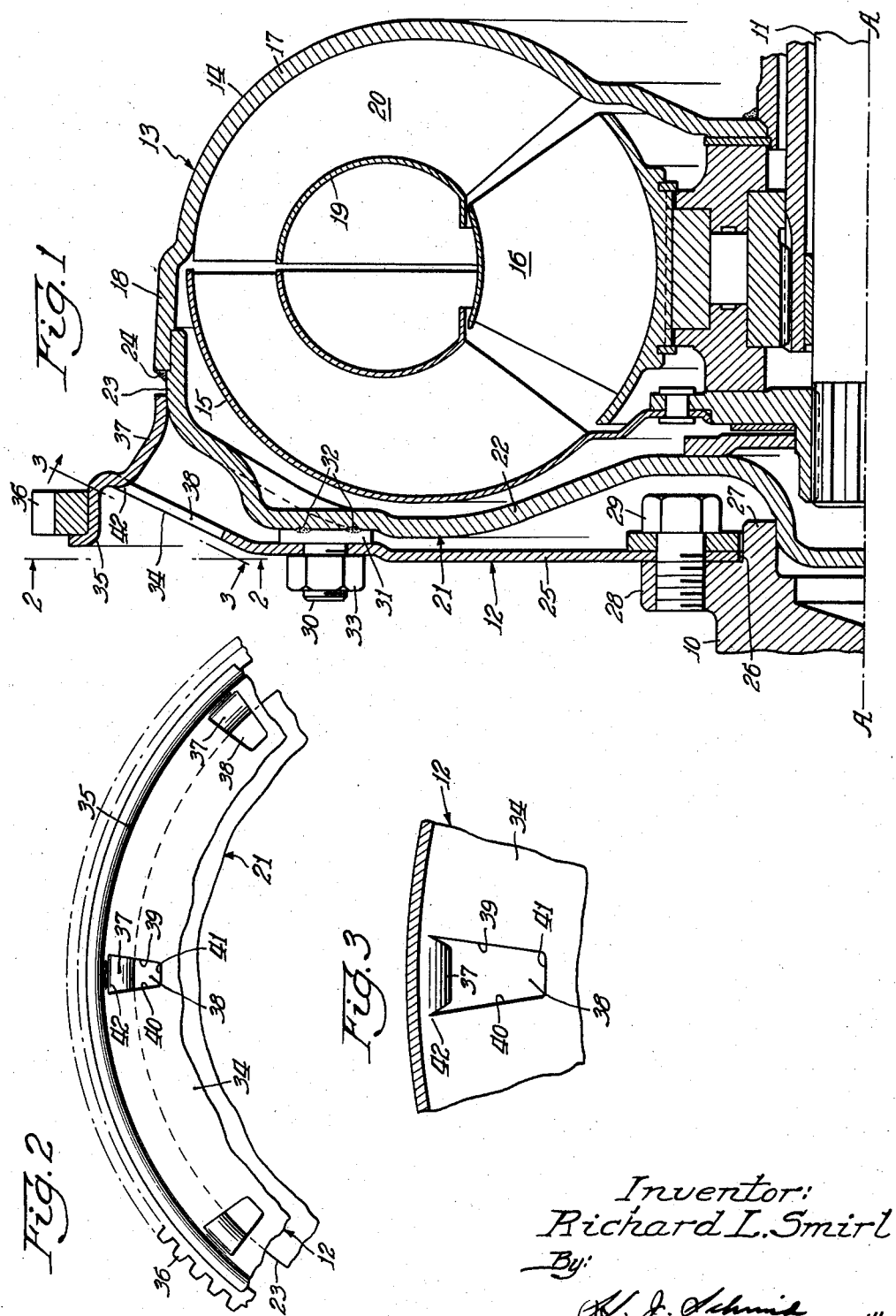

2,913,925

VIBRATION DAMPENING DEVICE FOR DRIVE MECHANISMS

Richard L. Smirl, La Grange Park, Ill., assignor to Borg-Warner Corporation, Chicago, Ill., a corporation of Illinois Application April 22, 1955, Serial No. 503,287

4 Claims. (Cl. 74—574)

This invention relates to vibration dampening devices for drive mechanisms.

Drive mechanisms, presently employed with automotive transmissions, comprise a stamped steel flywheel to transmit drive from the engine to the transmission. The flywheel is formed as a thin resilient metallic stamping which can flex to accommodate slight misalignment between the engine and transmission. In starting the engine, the conventional starting electric motor rotates a gear having teeth in mesh with ring gear teeth on the flywheel stamping and this gear train causes the flywheel to vibrate creating audible resonance of the flywheel and resulting in the starting gear noise level being amplified in the flywheel, in a manner annoying to the operator of the automobile.

An object of the invention is to provide a vibration dampening device for drive mechanisms.

Another object of the invention is to provide a vibration dampening device for drive mechanisms to prevent audible resonance vibrations of drive-transmitting portions of the drive mechanism.

Another object of the invention is to provide a vibration dampening device for drive mechanisms embodying a thin resilient metallic flywheel capable of vibrations producing noise.

A further object of the invention is to provide a vibration dampening device for drive mechanisms embodying a thin metallic flywheel stamping having a ring gear meshed with a starting gear of a starting motor, the drive mechanism further comprising a hydraulic coupling connected to the flywheel stamping, and the device including tongues or fingers forming portions of the stamping and extending toward and into frictional contact with a portion of the coupling and effectively eliminating noise-producing vibrations of the flywheel stamping.

Other objects and advantages of the invention will become apparent from the following description taken with the accompanying drawing, in which:

Fig. 1 is a longitudinal sectional view of a fragmentary portion, preferably one-half, of a drive mechanism embodying the vibration dampening device of the invention;

Fig. 2 is a fragmentary elevational view taken as indicated by line 2—2 of Fig. 1;

Fig. 3 is an enlarged fragmentary elevational view, partly in section, taken on line 3—3 of Fig. 1.

Referring to the drawing and particularly Fig. 1, the invention is illustrated as embodied in a drive mechanism rotatable about an axis A—A and operable to transmit drive between an engine crank shaft 10 and a transmission input shaft 11. The drive mechanism comprises a flywheel generally indicated at 12 and connected to the crankshaft 10, and a hydraulic torque converter generally indicated at 13 and connected to the flywheel 12 and transmission shaft 11.

More particularly, the hydraulic torque converter comprises a bladed impeller 14 connected to the flywheel 12, a bladed turbine 15 connected to the transmission shaft 11, and a bladed stator 16. The hydraulic torque converter functions to multiply the torque between the crankshaft 10 and transmission input shaft 11, all of the converter elements having blades provided with shapes such that they are capable of providing a toroidal circulation of fluid, whereby the vanes of the impeller 14 impart energy to a body of fluid within the converter and the turbine 15 receives the energy of the fluid, the stator element having vanes cooperating with vanes of the impeller and turbine and having a reaction force impressed thereon by the fluid, the vanes of the converter elements being effective, when the stator is held from rotation to serve as a reaction element, to change the direction of flow of the fluid so that the converter multiplies torque.

The impeller 14 comprises a substantially semi-toroidal shell 17 having an axially spaced and extending outer peripheral portion 18 forming a cylindrical flange, a core ring 19, and blades 20 extending between and connecting the shell and core ring; the shell, core ring and blades being stampings formed of sheet metal, such as steel. The shell 17 cooperates with a plate or shell 21 to provide a housing or container therewith defining a fluid chamber receiving the turbine, stator and blades of the impeller. The plate or shell 21 is a bowl-shaped member or stamping of sheet metal, such as steel, and is asymmetric or distorted semi-toroidal cross-section, having a radially extending portion 22, and an axially extending portion 23 defining a cylindrical flange telescoped within the flange 18 of the shell 17 and secured thereto by a continuous weld 24 extending about the edge of the snell 17 and outer surface of the plate 21.

The flywheel 12 is a stamping of sheet metal, such as steel, which is thin and flexible to accommodate misalignment between the engine and transmission. More particularly, the flywheel comprises an axially flexible annular drive plate having a radially extending flat portion 25 provided with a central opening 26 for receiving an annular flange 27 on the shaft 10, the radially inner portion of the plate being secured to a radially extending flange 28 of the shaft 10 by bolts 29 positioned in openings in the plate and threaded into the flange 28 on the shaft 10. The plate 12 is connected to the shell 21 by bolts 30 having heads 31 secured to the shell 21 by welds 32, 32 and engaging the plate 12 and axially spacing the radially extending portion 22 from the plate, the shanks of the bolts being positioned in openings in the plate and in the threaded engagement with nuts 33 to securely hold the plate 12 in assembly with the shell 21. The plate 12 further comprises an angularly offset portion 34 integral with and extending outwardly of the flat portion 25 and terminating in a reversely bent axially extending flange 35 engaging the inner surface of a ring gear 36 press-fitted or otherwise fixed to the flange 35 to compel rotation of the flywheel and crankshaft 10 to crank the engine to start the engine when the conventional starting electric motor of the vehicle is energized to rotate a gear in mesh with the ring gear 36. The described connection of the flywheel to the shell 21 causes rotation of the shell 21 and the impeller 14 during starting of the engine and subsequent operation of the engine.

The vibration dampening device of the invention is utilized to prevent audible resonant vibrations which occur in thin sheet metal flywheel stampings in starting the engine and result in the starter gear noise level being amplified in the flywheel stamping to the annoyance of the operator of the vehicle. The vibration dampening device comprises a plurality of circumferentially spaced fingers or tongues 37 extending outwardly from the angularly offset portion 34 of the flywheel plate 12 and resiliently and frictionally engaging the outer surface of the axially extending portion 23 of the shell 21. The frictional contact between the fingers 37 and the shell 21 of the converter is effective to dampen resonant vibrations in the stamped flywheel assembly caused by the starting gear and electric motor combination, as well as other types of vibrations during subsequent operation of the engine.

Describing the vibration dampening device in greater detail, the fingers or tongues 37 are stamped from the angularly offset portion 34 of the flywheel plate by any suitable cutting tool effective to cut the metal of the flywheel plate 12 at equidistantly circumferentially spaced portions thereof to provide the fingers each of which is bent laterally outwardly of the plate to assume a generally arcuate form in cross-section when the free end of the finger is engaged with the shell 21 in the assembly of the flywheel and the shell 21 and the finger is thereby flexed to frictionally engage the shell 21, as shown in Fig. 1. Referring to Figs. 2 and 3, the cutting operation of the flywheel plate 12 to obtain the fingers 37 results in circumferentially spaced openings 38 each having radially spaced side edges 39 and 40 converging toward the axis of the plate and a circumferentially extending radially inner edge 41 terminating at and connecting the radially inner ends of the side edges 39 and 40. Each finger, necessarily resulting from this cutting operation conforms to the contour of the opening 38 and extends radially inwardly from its base 42 connected to and forming an integral portion of the flywheel plate, and terminating at the radially outer ends of the side edges 39 and 40. The base 42 of each finger is of greater width than any other portion of the finger and this factor, coupled with the shape of the finger, affords sufficient backing of the finger to tightly hold the finger in engagement with the shell 21 when the finger is bent radially outwardly and the flywheel is assembled with the shell 21, while being capable of flexing to permit the ready assembly of the shell and flywheel and frictional engagement of the fingers with the shell after assembly. In the assembly of the shell and flywheel, the bolts 30 of the shell 21 are positioned within the openings in the flywheel and the subsequent application of the nuts 33 to the bolts connects the shell to the flywheel while moving the fingers of the flywheel toward the shell to flex in their engagement with the shell as described.

While this invention has been described in detail in its present preferred form or embodiment, it will be apparent to persons skilled in the art, after understanding the improvements, that various changes and modifications may be made therein, without departing from the spirit or scope thereof. It is aimed in the appended claims to cover all such changes and modifications.

I claim:

1. In combination, a rotatable driving shaft; a flywheel plate of flexible sheet metal having a substantially flat portion secured to and driven by said driving shaft and extending radially of said driving shaft, and a portion angularly offset and disposed radially outwardly of said flat portion and terminating in an annular flange at its radially outer edge; a ring gear surrounding and connected to said flange; a drive transmitting device including a drive member; means radially spaced from said driving shaft and rigidly connecting said drive member to said flat portion of said plate; and a plurality of fingers on said plate and struck from the angularly offset portion of said plate and extending from the juncture of said angularly offset portion and said flange laterally from said angularly offset portion of said plate in an axial direction toward said drive member to frictionally engage said drive member.

2. A vibration dampener for a fluid coupling comprising a drive plate of flexible sheet metal rotatable about an axis and extending radially of said axis and terminating in an annular flange at its radially outer edge; a ring gear surrounding and connected to said flange; means radially spaced from said axis adapted rigidly to connect said plate to a housing of a fluid coupling for driving said fluid coupling; and a plurality of fingers integral with said plate and extending laterally from said plate in an axial direction and adapted to overlie and frictionally and resiliently to engage the housing of the fluid coupling.

3. A vibration dampener for a fluid coupling comprising a drive plate of flexible sheet metal rotatable about an axis and extending radially of said axis; a ring gear surrounding and connected to said plate; said plate being adapted to be rigidly connected to a driven member of the coupling at a connection zone in limited radially spaced relation to said axis and having radially outwardly from the connection zone a plurality of integrally formed fingers extending laterally thereof and adapted to overlie and frictionally to engage the driven member whereby vibrations transmitted to said ring gear are dampened before reaching the driven member.

4. A vibration dampener for a fluid coupling comprising a drive plate of flexible sheet metal rotatable about an axis and extending radially of said axis, said plate being adapted to be connected to a driven member of the coupling; and a plurality of circumferentially spaced integrally formed struck out fingers adapted to extend into overlying relationship with the coupling, said fingers adapted frictionally to engage the coupling in a resilient snubbing relationship to prevent the transmission of vibrations from the plate to the driven member of the coupling.

References Cited in the file of this patent

UNITED STATES PATENTS

| | | |
|---|---|---|
| 1,434,414 | Stoney | Nov. 7, 1922 |
| 1,753,365 | Daukus | Apr. 8, 1930 |
| 2,346,732 | Crawford et al. | Apr. 18, 1944 |
| 2,660,957 | Koskinen | Dec. 1, 1953 |